United States Patent [19]
Newman et al.

[11] Patent Number: 5,990,256
[45] Date of Patent: Nov. 23, 1999

[54] LONG CHAIN BRANCHED SYNDIOTACTIC VINYL AROMATIC POLYMERS

[75] Inventors: Thomas H. Newman; Yi-Bin Huang, both of Midland, Mich.; Mark S. Chahl, Masslau, Germany

[73] Assignee: The Dow Chemical Company, Midland, Mich.

[21] Appl. No.: 09/037,420

[22] Filed: Mar. 10, 1998

Related U.S. Application Data

[60] Provisional application No. 60/048,079, May 30, 1997.
[51] Int. Cl.$^6$ .................. C08F 212/34; C08F 236/04; C08F 236/22
[52] U.S. Cl. .................. 526/340; 526/335; 526/336; 526/339; 526/346; 526/347; 526/347.1
[58] Field of Search ................. 526/336, 329.2, 526/340, 347, 346

[56] References Cited

U.S. PATENT DOCUMENTS 5,202,402  4/1993  Funaki et al. .
5,484,866  1/1996  Loveless ............................ 526/340

FOREIGN PATENT DOCUMENTS

WO9808881  3/1998  WIPO .

*Primary Examiner*—Fred Zitomer

[57] ABSTRACT

Long chain branched syndiotactic vinyl aromatic polymers can be obtained by polymerizing the vinyl aromatic monomer in the presence of a small amount of a multifunctional monomer under conditions such that a syndiotactic vinyl aromatic polymer is produced.

14 Claims, No Drawings

LONG CHAIN BRANCHED SYNDIOTACTIC VINYL AROMATIC POLYMERS

CROSS-REFERENCE STATEMENT

This application claims the benefit of U.S. Provisional application Ser. No. 60/048,079, filed May 30, 1997.

BACKGROUND OF THE INVENTION

The present invention relates to syndiotactic vinyl aromatic polymers.

Syndiotactic vinyl aromatic polymers such as syndiotactic polystyrene (SPS) are useful polymers having a high melting point and crystallization rate as well as excellent heat and chemical resistance. However, in some applications such as in cast-tenter films and fibers, the melt strength is insufficient at processing temperatures. Additionally, the melt flow rate or melt flowability is insufficient at processing temperatures in applications such as injection molding of thin walled articles.

Syndiotactic copolymers have also been developed having superior heat and chemical resistance. U.S. Pat. No. 5,202,402 issued to Funaki et al. utilizes a difunctional monomer to form a syndiotactic copolymer with styrene, however, the polymer fully crosslinks at high temperatures, forming a thermoset and cannot be melt processed.

Therefore, it would be useful to obtain a syndiotactic vinyl aromatic polymer, having good heat and chemical resistance, which is melt processable at high temperatures while maintaining high melt strength and good melt flowability.

SUMMARY OF THE INVENTION

The present invention is directed to a long chain branched syndiotactic vinyl aromatic (LCB-SVA) polymer. Long chain branches can be produced during polymerization by polymerizing in the presence of a small amount of a multifunctional monomer.

LCB-SVA polymers can be melt processed at high temperatures while maintaining good high melt strength and good melt flowability.

DESCRIPTION OF THE PREFERRED EMBODIMENTS

In one embodiment, the present invention is a long chain branched syndiotactic vinyl aromatic polymer.

As used herein, the term "syndiotactic" refers to polymers having a stereoregular structure of greater than 90 percent syndiotactic, preferably greater than 95 percent syndiotactic, of a racemic triad as determined by $^{13}$C nuclear magnetic resonance spectroscopy.

Syndiotactic vinyl aromatic polymers are homopolymers and copolymers of vinyl aromatic monomers, that is, monomers whose chemical structure possess both an unsaturated moiety and an aromatic moiety. The preferred vinyl aromatic monomers have the formula $$H_2C=CR\text{-Ar};$$

wherein R is hydrogen or an alkyl group having from 1 to 4 carbon atoms, and Ar is an aromatic radical of from 6 to 10 carbon atoms. Examples of such vinyl aromatic monomers are styrene, alpha-methylstyrene, ortho-methylstyrene, meta-methylstyrene, para-methylstyrene, vinyl toluene, para-t-butylstyrene, vinyl naphthalene and the like; bromo-substituted styrenes, especially p-vinyltoluene and ring brominated or dibrominated styrenes. Brominated styrenes are particularly useful in the preparation of ignition resistant syndiotactic vinylaromatic polymers. Alternatively, ignition resistant LCB-SVA polymers can be produced by brominating LCB-SVA polymers. Representative syndiotactic copolymers include styrene-p-methylstyrene, styrene-p-t-butylstyrene and styrene-vinyl toluene copolymers. Syndiotactic vinyl aromatic polymers and monomers made therefrom are known in the art having been previously disclosed in, for example, U.S. Pat. No. 4,680,353; U.S. Pat. No. 4,959,435; U.S. Pat. No. 4,950,724; and U.S. Pat. No. 4,774,301, included herein by reference. Syndiotactic polystyrene is the currently preferred syndiotactic vinyl aromatic polymer.

Long chain branching can be achieved by polymerizing a vinyl aromatic monomer in the presence of a small amount of a multifunctional monomer under conditions sufficient to produce a syndiotactic vinyl aromatic polymer. A multifunctional monomer is any compound having more than one olefinic functionality which can react with a vinyl aromatic monomer under polymerization conditions. Typically, the multifunctional monomer will contain 2–4 olefinic functionalities and is represented by formula (I):

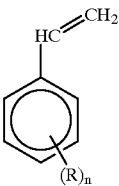

wherein R is a vinyl group or a group containing from 2 to 20 carbon atoms including a terminal vinyl group, wherein the groups containing 2 to 20 carbon atoms may be alkyl, alkenyl, cycloalkyl, or aromatic, wherein cycloalkyl groups contain at least 5 carbon atoms and aromatic groups contain at least 6 carbon atoms, n is an integer from 1 to 3 wherein the R groups are meta or para in relation to the vinyl group of formula (I), and when n is greater than 1, R may be the same or different. Preferably R is a vinyl group.

Preferably the multifunctional monomer contains two terminal vinyl groups wherein n would equal 1. Typically, such monomers include difunctional vinyl aromatic monomers such as di-vinyl-benzene or di-styryl-ethane and the like.

The amount of multifunctional monomer will depend upon the weight average molecular weight (Mw) of the polymer to be produced, but typically is from 10, preferably from 50, more preferably from 75, and most preferably from 100 ppm to 5000, preferably to 200, more preferably to 1000, and most preferably to 650 ppm, based on the amount of vinyl aromatic monomer.

The multifunctional monomer can be introduced into the polymerization by any method which will allow the multifunctional monomer to react with the vinyl aromatic monomer during polymerization to produce a LCB-SVA polymer. For example, the multifunctional monomer can be first dissolved in the vinyl aromatic monomer prior to polymerization or introduced separately into the polymerization reactor before or during the polymerization. Additionally, the multifunctional monomer can be dissolved in an inert solvent used in the polymerization such as toluene or ethyl benzene.

Any polymerization process which produces syndiotactic vinyl aromatic polymers can be used to produce the LCB-SVA polymers of the present invention as long as a multifunctional monomer is additionally present during polymerization. Typical polymerization processes for producing syndiotactic vinyl aromatic polymers are well known in the art and are described in U.S. Pat. Nos. 4,680,353, 5,066,741, 5,206,197 and 5,294,685, which are incorporated herein by reference.

Typically, the weight average molecular weight (Mw) of the LCB-SVA polymer is from 50,000, preferably from 100,000, more preferably from 125,000, and most preferably from 150,000 to 3,000,000, preferably to 1,000,000, more preferably to 500,000 and most preferably to 350,000.

A branched syndiotactic vinyl aromatic polymer contains extensions of syndiotactic vinyl aromatic polymer chain attached to the polymer backbone. A long chain branched syndiotactic vinyl aromatic polymer typically contains chain extensions of at least 10 monomer repeating units, preferably at least 100, more preferably at least 300, and most preferably at least 500 monomer repeating units.

The LCB-SVA polymers of the present invention can also be combined with additives such as pigments, antioxidants, including hindered phenols such as 2,6-di-t-butyl-4-methylphenol, stearyl-$\beta$-(3,5-di-tert-butyl-4-hydroxyphenol)propionate, and triethylene glycol-bis-3-(3-tert-butyl-4-hydroxy-5-methylphenyl)propionate or phosphorus-based compounds such as tris(2,4-tert-butylphenyl)phosphite and 4,4'-butylidenebis(3-methyl-6-tert-butylphenyl-di-tridecyl)-phosphite; antiblock agents such as fine particles of alumina, silica, aluminosilicate, calcium carbonate, calcium phosphate, silicon resins, and the like; fillers such as glass fibers, micas, talcs, carbon fibers, graphite, titanium dioxide, silica, calcium carbonate, calcium sulfate, barium carbonate, magnesium carbonate, magnesium sulfate, barium sulfate, calcium oxysulfate, tin oxide alumina, kaolin, silicon carbide, metal powder, glass powder, glass flake glass beads and the like; impact modifiers, ignition resistant agents, coupling agents, for example maleated polymers, including maleic anhydride modified polyphenylene oxide, or maleic anhydride modified syndiotactic vinylaromatic polymers; binders to improve the wet strength of a base fabric, flame retardants including brominated polystyrene, brominated syndiotactic vinylaromatic polymers, antimony troxid4, and polytetrafluoroethylene; light stabilizers, such as a hindered amine-based compounds or benzotriazole-based compounds; lubricants such as stearic acid, behenic acid, zinc stearate, calcium stearate, magnesium stearate and ethylenebisstearamide; plasticizers such as an organopolysiloxane or mineral oil; blowing agents, extrusion aids, stabilizers such as bis (2,4-di-tertbutylphenyl)pentaerythritol and trig nonyl phenyl phosphite; and the like. Additionally, the LCB-SVA polymers of the present invention can be combined or blended with other polymers.

The LCB-SVA polymers of the present invention can be used to produce thin walled injection molded articles, blown film, tentered film, melt blown fibers, spunbond nonwoven fabrics and the like.

The following examples are provided to illustrate the present invention. The examples are not intended to limit the scope of the present invention and they should not be so interpreted. Amounts are in weight parts or weight percentages unless otherwise indicated.

EXAMPLE 1

All reactions are carried out under inert atmosphere in a dry box. The reagents, toluene and styrene monomer are purified and handled using standard inert atmosphere techniques. Di-styryl-ethane is prepared according to the procedure of W. H. Ll, et al., J. Polymer Sci., Part A, Polymer Chem., 32, (1994), 2023.

A 10 percent methylalumoxane in toluene solution, 1 Molar triisobutylaluminum in toluene and a 0.03 Molar solution of pentamethylcyclopentadienyltitanium trimethoxide in toluene are mixed in a dry box in volumetric flasks in ratios of 75:25:1 with a final concentration of the catalyst solution, based on titanium, of 0.003 Molar.

4.54 gm of styrene are charged into 4 ampoules. A 1 percent solution of di-styryl-ethane (DSE) in toluene, is added at the ppm level indicated below. The ampoules are then sealed and equilibrated at the polymerization temperature of 70° C. for 10 minutes. Polymerization is initiated by addition of catalyst solution in mole ratio of styrene to titanium of 175,000:1. The polymerization is quenched by the addition of an excess of methanol after one hour. The polymer is isolated and dried and molecular weight is determined via high temperature size exclusion chromatography. The results are shown below.

| ppm DSE | Percent Conversion | Mn | Mw | Mz | Mw/Mn |
|---|---|---|---|---|---|
| 0 | 82 | 98,700 | 345,000 | 684,600 | 3.50 |
| 200 | 86 | 67,500 | 496,900 | 1,126,100 | 7.36 |
| 400 | 85 | 125,800 | 662,400 | 1,768,000 | 5.27 |
| 800 | 79 | 104,900 | 659,300 | 1,703,700 | 6.28 |

The significant increase in Mz with di-styryl-ethane is an indication of long chain branching in the SPS polymer.

EXAMPLE 2

Larger scale reactions are carried out in a 5" Teledyne kneader-mixer. Operation of this device is described in U.S. Pat. No. 5,254,647. Styrene monomer is mixed with a 1.3 percent solution of di-styryl-ethane (DSE) in toluene in the amount indicated below and is fed to the reactor at a rate of 17.5 kg/hr. The polymerization is conducted at a temperature of 55–67.5° C. A catalyst solution of methyaluminoxane, triisobutylaluminum and octahydrofluorenyltitanium trimethoxide is also fed to the reactor at styrene to titanium mole ratios of 80,000:1 to 100,000:1. The product is a fine, free-flowing, white powder ranging in conversion from 36 to 50 percent. Samples are collected and quenched by the addition of an excess of methanol. The samples are dried in a nitrogen-swept, 220° C., 5 mmHg absolute vacuum oven for two hours. Molecular weight of the polymer is determined via high temperature size exclusion chromatography. The results are shown below.

| Sample ID | ppm DSE | Mw | Mn | Mz | Mw/Mn |
|---|---|---|---|---|---|
| 1 | 400 | 294,900 | 82,100 | 1,151,900 | 3.59 |
| 2 | 400 | 334,800 | 86,500 | 1,377,300 | 3.87 |
| 3 | 250 | 420,000 | 92,300 | 2,418,300 | 4.55 |
| 4 | 250 | 368,900 | 71,600 | 1,962,000 | 5.15 |

The significant increase in Mz with di-styryl-ethane is an indication of long chain branching in the SPS polymer. The above samples, in the form of powders, are converted to pellets using a 0.5" single-screw extruder. The molecular weights of the pellets are summarized below:

| Sample ID | Mw | Mn | Mz | Mw/Mn |
|---|---|---|---|---|
| 1 | 279,900 | 75,000 | 1,137,400 | 3.73 |
| 2 | 304,900 | 82,000 | 1,161,100 | 3.72 |
| 3 | 313,000 | 74,900 | 1,294,900 | 4.18 |
| 4 | 301,000 | 65,000 | 1,204,900 | 4.63 |

Melt strength is measured according to the technique described in S. K. Goyal, *Plastics Engineering*, 51 (2), 25, 1995, with test conditions of 1 in./min. plunger speed, 50 ft/min winder rate, and 279° C. Melt flow rate is measured according to ASTM D1238 with test conditions of 1.2 Kg load and 300° C. A 300,000 Mw linear SPS polymer is used as the control. The results are summarized below:

| Sample III | Melt Strength | (MFR (g/10 min.) |
|---|---|---|
| 1 | 4.0 | 19.1 |
| 2 | 5.4 | 14.4 |
| 3 | 5.5 | 15.5 |
| 4 | 4.5 | 17.1 |
| Control | 1.9 | 3.6 |

EXAMPLE 3

Larger scale reactions are carried out in a 5" Teledyne kneader-mixer, with mean residence time of 18 minutes, followed by a 500 l tank reactor, with mean residence time of 10 hours. Operation of these devices are described in U.S. Pat. No. 5,254,647. Styrene monomer is mixed with 250 ppm of a 3.3 percent solution of di-styryl-ethane in toluene and fed to the reactor at 17.5 kg/hr. Polymerization is carried out at a temperature of 5520 C. A catalyst solution of methylaluminoxane, triisobutylaluminum and octahydrofluorenyltitanium trimethoxide is also fed to the reactor at styrene to titanium mole ratios of 80,000:1. After polymerization, the polymer is devolatilized and pelletized as described previously. The molecular weight of the polymer is determined via high temperature size exclusion chromatography and the results are shown below:

| Mw | Mn | Mz | Mz + 1 | Mw/Mn |
|---|---|---|---|---|
| 366,000 | 86,300 | 1,635,100 | 3,552,000 | 4.24 |

The significant increase in Mz and Mz+1 in the product is an indication of long chain branching in the SPS polymer.

What is claimed is:

1. A long chain branched syndiotactic vinyl aromatic polymer, having a molecular weight of from 125,000 to 3,000,000, produced by polymerizing a vinyl aromatic monomer in the presence of from 10 to 1000 ppm of a multifunctional monomer having more than one olefinic functionality, based on the amount of vinyl aromatic monomer, under conditions sufficient to produce a syndiotactic vinyl aromatic polymer, wherein the long chain branched syndiotactic vinyl aromatic polymer contains extensions of at least 10 monomer repeating units of syndiotactic vinyl aromatic polymer chain attached to the polymer backbone.

2. The polymer of claim 1 wherein the syndiotactic vinyl aromatic polymer is polystyrene.

3. The polymer of claim 1 wherein the multifunctional monomer is of the formula:

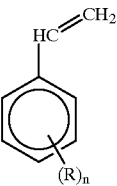

wherein R is a vinyl group or a group containing from 2 to 20 carbon atoms including a terminal vinyl group, wherein the groups containing 2 to 20 carbon atoms may be alkyl, alkenyl, cycloalkyl, or aromatic, wherein cycloalkyl groups contain at least 5 carbon atoms and aromatic groups contain at least 6 carbon atoms, n is an integer from 1 to 3 wherein the R groups are meta or para in relation to the vinyl group of formula (I), and when n is greater than 1, R may be the same or different.

4. The polymer of claim 3 wherein the multifunctional monomer is di-vinyl-benzene.

5. The polymer of claim 3 wherein the multifunctional monomer is di-styryl-ethane.

6. The polymer of claim 1 wherein the syndiotactic vinyl aromatic polymer is a syndiotactic copolymer of styrene and para-methylstyrene.

7. A composition comprising the polymer of claim 1.

8. A process of preparing the polymer of claim 1 comprising polymerizing a vinyl aromatic monomer in the presence of a multifunctional monomer under conditions such that a syndiotactic vinyl aromatic polymer is prepared.

9. The process of claim 8 wherein the syndiotactic vinyl aromatic polymer is polystyrene.

10. The process of claim 8 wherein the vinyl aromatic monomer is polymerized in the presence of from 10 to 1000 ppm of a multifunctional monomer based on the amount of vinyl aromatic monomer.

11. The process of claim 10 wherein the multifunctional monomer is of the formula:

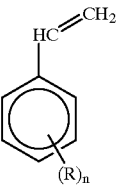

wherein R is a vinyl group or a group containing from 2 to 20 carbon atoms including a terminal vinyl group, wherein the groups containing 2 to 20 carbon atoms may be alkyl, alkenyl, cycloalkyl, or aromatic, wherein cycloalkyl groups contain at least 5 carbon atoms and aromatic groups contain at least 6 carbon atoms, n is an integer from 1 to 3 wherein the R groups are meta or para in relation to the vinyl group of formula (I), and when n is greater than 1, R may be the same or different. Preferably R is a vinyl group.

12. The process of claim 11 wherein the multifunctional monomer is di-vinyl-benzene.

13. The process of claim 11 wherein the multifunctional monomer is di-styryl-ethane.

14. The process of claim 8 wherein the syndiotactic vinyl aromatic polymer is a syndiotactic copolymer of styrene and para-methylstyrene.

* * * * *